(12) United States Patent
Horiuchi et al.

(10) Patent No.: US 7,142,787 B2
(45) Date of Patent: Nov. 28, 2006

(54) OPTICAL DATA TRANSMISSION METHOD AND ITS SYSTEM, OPTICAL TRANSMITTER AND ITS METHOD, AND OPTICAL SWITCHER

(75) Inventors: Yukio Horiuchi, Kamifukuoka (JP); Shu Yamamoto, Kamifukuoka (JP)

(73) Assignee: KDDI Corporation, Tokyo (JP)

(*) Notice: Subject to any disclaimer, the term of this patent is extended or adjusted under 35 U.S.C. 154(b) by 983 days.

(21) Appl. No.: 09/885,498

(22) Filed: Jun. 19, 2001

(65) Prior Publication Data
US 2001/0055136 A1  Dec. 27, 2001

(30) Foreign Application Priority Data
Jun. 20, 2000  (JP) .............................. 2000-184450

(51) Int. Cl.
*H04B 10/00* (2006.01)

(52) U.S. Cl. .................. 398/154; 398/182; 398/183; 398/188; 398/193; 398/194; 398/140; 398/155; 370/474; 370/475; 370/471; 370/503

(58) Field of Classification Search ................ 398/182, 398/183, 188, 193, 194, 140, 154, 155; 370/474, 370/475, 471, 503
See application file for complete search history.

(56) References Cited

U.S. PATENT DOCUMENTS 6,151,149 A * 11/2000 Rybicki et al. .............. 398/191
6,310,709 B1 * 10/2001 Bergano ...................... 398/185
6,592,273 B1 * 7/2003 Habel et al. ................. 398/140

* cited by examiner

*Primary Examiner*—Hanh Phan
(74) *Attorney, Agent, or Firm*—Christie, Parker & Hale LLP

(57) ABSTRACT

This invention discloses a method to easily extract a header from an optical packet. An optical data transmission method to transmit an optical packet composed of a header and data containing steps of generating a second clock which has a frequency equal to one integer of that of a first clock carrying the data and synchronizes with the first clock, and carrying the header information on the second clock.

8 Claims, 4 Drawing Sheets

OPTICAL DATA TRANSMISSION METHOD AND ITS SYSTEM, OPTICAL TRANSMITTER AND ITS METHOD, AND OPTICAL SWITCHER

FIELD OF THE INVENTION

This invention relates to an optical data transmission method and its system, an optical transmitter and its method, and an optical switcher, and more specifically to an optical data transmission method and its system, an optical transmitter and its method, and an optical switcher to easily switch optical packets in an optical network.

BACKGROUND OF THE INVENTION

In an optical network, to dynamically switch optical signals or optical packet signals, it is necessary that an optical packet signal or optical signal frame having a data added with a header or a label showing route information such as its destination is output onto the optical network, and an optical switcher sets a route for the optical packet signal according to the header. This method is theoretically the same with ordinary electric signal data transmission.

However, in optical transmission, a bit stream is usually as fast as 10 Gb/s or more, and accordingly it is a problem how to add a header containing destination information etc. to its data. To solve the problem, two configurations have been well known. One configuration is to arrange the destination information etc. as a header immediately before the data in a similar way to a configuration for an electric signal, and the other one is to add route information containing the destination information etc. as a label on an envelope of an optical signal using intensity modulation. As an example of the latter configuration, to put it concretely, a subcarrier superimposing system is well known in which a carrier of any frequency is modulated by the route information and intensity of an optical signal is modulated by the obtained modulation signal.

However, such a system having the above configuration in which the header is added directly before the data becomes inevitably high-priced because a high speed logic circuit is required to receive and decode the header.

In the subcarrier superimposing system, it is necessary to increase a degree of the intensity modulation to improve the detectivity of the label, and this causes a quality deterioration of the optical signal. In addition, a label signal cannot pass through a data regenerator or a wavelength converter which reforms a waveform of the optical signal.

SUMMARY OF THE INVENTION

It is therefore an object of the present invention to provide an optical data transmission method and its system, an optical transmitter and its method, and an optical switcher capable of optical switching with a simpler configuration.

An optical data transmission method according to the invention is a method to transmit an optical packet containing a header and data composed steps of generating a second clock which has a frequency equal to one integer of that of a first clock carrying the data and synchronizes with the first clock and, carrying the header information on the second clock.

An optical data transmission system according to the invention is an optical data transmission system to transmit an optical packet composed of a header and data characterized by that the header information is carried on a second clock which has a frequency equal to one integer of that of a first frequency carrying the data and synchronizes with the first clock.

By carrying the header information on the second clock which is slower than the data, the header can be easily extracted. In addition, since the second clock is synchronized with the data, it is possible to pass a data regenerator and wavelength converter.

An optical transmitter according to the invention is an optical transmitter to output an optical packet containing a header and data composed of a frequency divider to generate a second clock which is synchronized with a first clock carrying the data and has a frequency equal to one integer of that of the first clock, a phase modulator to modulate a phase of the second clock by the header information, and a data arranger to place the first clock carrying the data after the output data from the phase modulator.

With the above configuration, it is possible to form an optical packet with a header which is easily extracted, and therefore an optical conversion becomes easier.

Preferably, the optical transmitter is further composed of a converter to convert the output data from the data arranger into an optical signal. This means that the data can be converted into an optical signal after packetization.

An optical transmission method according to the invention is an optical transmission method to output an optical packet composed of a header and data composed a step of generating a second clock which synchronizes with a first clock carrying the data and has a frequency equal to one integer of that of the first clock, a step of modulating a phase of the second clock with the header information, and a step of arranging the first clock carrying the data after the phase-modulated second clock.

With the above procedure, an optical packet with a header which is easily extracted can be formed, and therefore the optical switching becomes easier.

Preferably, the phase-modulated second clock and the next first clock carrying the data are converted into optical signals. That is, they can be converted into optical signals after packetization.

An optical switcher according to the invention is an optical switcher to switch optical packet signals consist of a data carried on a first clock and a header carried on a second clock which has a frequency equal to one integer of that of the first clock and synchronizes with the first clock, the switcher composing of a plurality of optical input terminals, a plurality of optical dividers to divide each input light from the plurality of the optical input terminals into two portions, a plurality of header extractors to extract a header from one of the two portions divided by each of the plurality of the optical dividers, a plurality of optical delays to delay the other of the two portions divided by each of the plurality of the optical divider for a predetermined time, an optical route switcher to switch a route of each output light from the plurality of the optical delays, and a switch controller to determine a route of an optical signal to enter the corresponding optical input terminal and to control the optical route switcher according to output from each of the plurality of the header extractors.

By carrying a header on the above-described second clock, the extraction of the header becomes easier, and the whole configuration of the optical switcher can be simplified.

BRIEF DESCRIPTION OF THE DRAWING

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
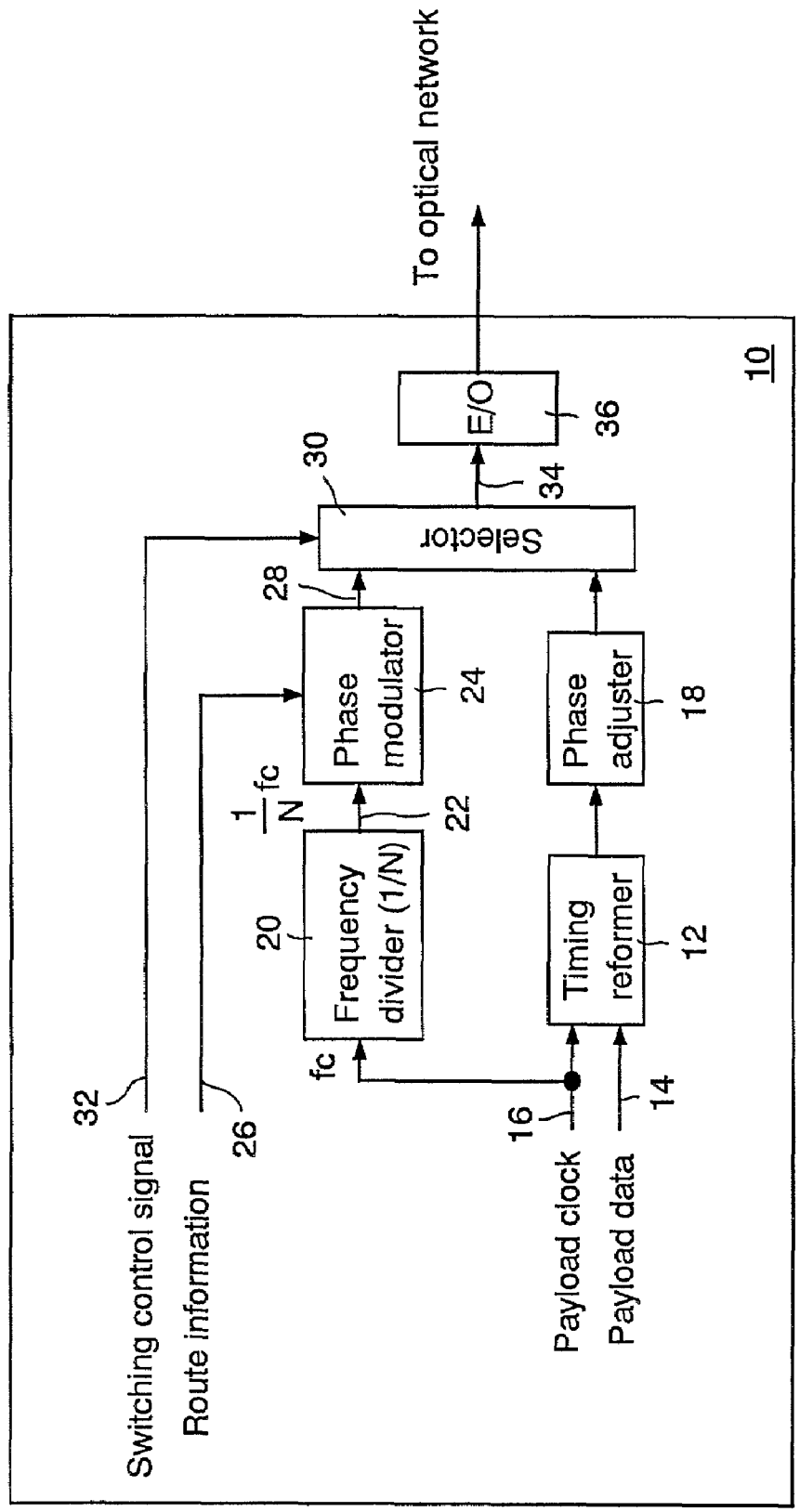
FIG. 1 shows a schematic block diagram of an embodiment of an optical transmitter according to the invention.
Figure 2:
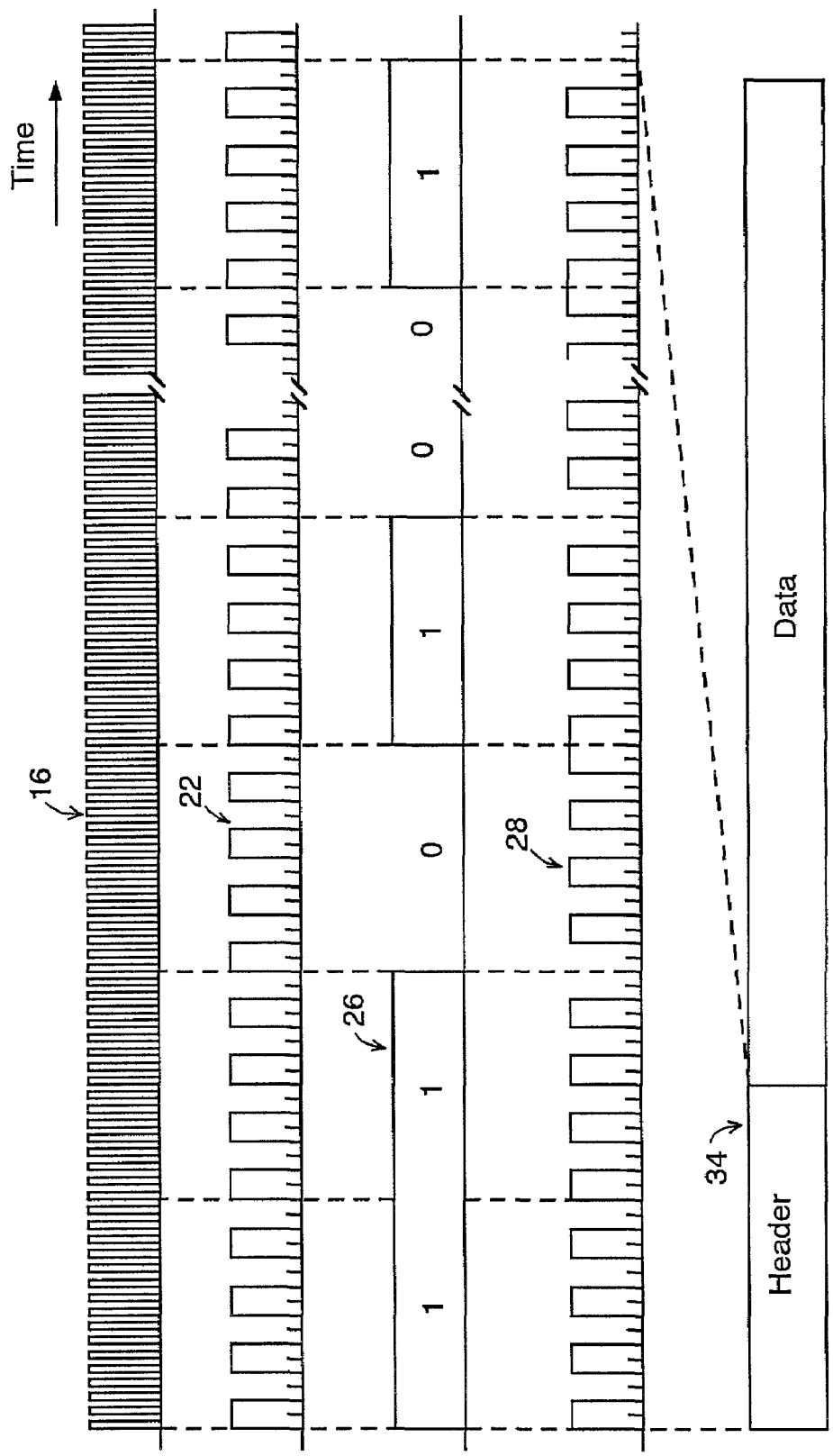
FIG. 2 is a timing chart showing a waveform of each part of the embodiment shown in FIG. 1.

FIG. 1 shows a schematic block diagram of an embodiment of an optical transmitter according to the invention, and FIG. 2 shows a timing chart of each part of the optical transmitter in FIG. 1.

In an optical transmitter 10, a timing reformer 12 reforms timing of a payload data 14 to be stored in an aimed data region of an optical packet signal according to a payload clock 16 such as a D-FF. A phase adjuster 18 adjusts a phase of the output from the timing reformer 12 relative to the after-mentioned header. A frequency fc of the payload clock 16 is, for example, 10 GHz.

A frequency divider 20 divides the frequency of the payload clock 16 into 1/N and applies a clock with the frequency (1/N) fc to a phase modulator 24. N is an integer, and it is set to 4 in this embodiment. The phase modulator 24 modulates a phase of an output clock 22 from the frequency divider 20 according to the route information 26. As shown in FIG. 2, an output signal 28 from the phase modulator 24 is a signal obtained by shifting the phase of the output clock from the frequency divider 20 by 0° or 180° according to a code value of the route information 26. In FIG. 2, a frequency of the output clock 22 from the frequency divider 20 is one quarter of the payload clock 16, i.e. 2.5 GHz, and the rate of the route information 26 is 625 Mbit/s. Accordingly, the route information 26 of 625 Mbit/s is carried by the carrier of 2.5 GHz which is one quarter of the payload data 14 of 10 Gbit/s.

A selector 30 selects the output 28 from the phase modulator 24 and then selects the output from the phase adjuster 18 according to a switching control signal 32. By following the above procedure, the selector 30 generates a packet signal 34 which has the output from the phase modulator 24 on a header part and the output from the phase adjuster 18 on a data part. An electric/optical converter 36 converts the output from the selector 30 into an optical signal. The output light from the electric/optical converter 36 is namely the output light of the optical transmitter 10 and is output onto an optical network as an optical packet signal.

As stated above, in this embodiment, since the header is composed of a low speed data compared to the payload data or the packet data, the optical switching becomes easier as is mentioned later. In addition, the header is based on a clock having the same rate with the payload data, and accordingly it is not disappeared after retiming, reshaping and regenerating known as "3R".

In the embodiment shown in FIG.1, although the electric signal is converted to the optical signal after the payload data is arranged behind the header, it is obvious that the electric signal can be converted into the optical signal in an earlier stage, for example prior to the selector 30.

Figure 3:
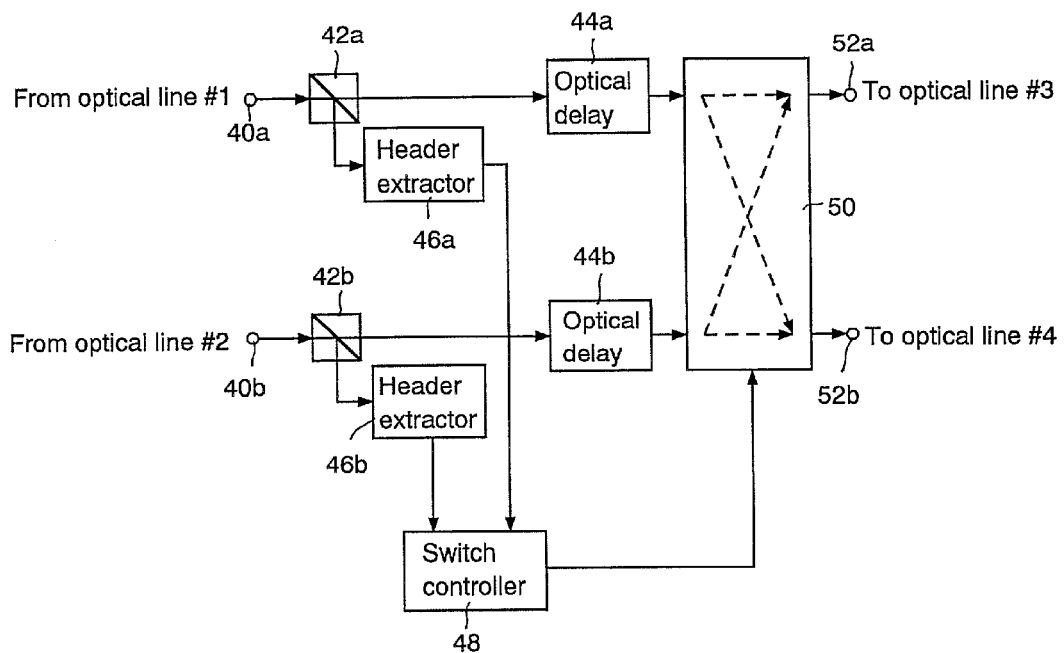
FIG. 3 shows a schematic block diagram of an embodiment of an optical switcher according to the invention.

FIG. 3 shows a schematic block diagram of an optical switcher having two inputs and two outputs. An optical signal from an optical line #1 inputs an optical input terminal 40a, and an optical signal from an optical line #2 inputs an optical input terminal 40b. These optical signals are both composed of optical packets formed as explained with reference to FIGS. 1 and 2. A divider 42a divides a optical signal from the optical input terminal 40a into two portions and applies one portion to an optical delay 44a and the other to a header extractor 46a. Similarly, a divider 42b divides an optical signal from the optical input terminal 40b into two portions and applies one portion to an optical delay 44b and the other to a header extractor 46b.

The header extractors 46a and 46b each extracts a header part out of the optical packet signal input from the dividers 42a and 42b respectively, detects route information contained in the header part, and supplies the detected route information to the switch controller 48.

An optical route switcher 50 has two input ports and two output ports and can switch routes between the two input ports and the two output ports according to a control signal from a switch controller 48. An output light from the optical delay 44a inputs a first input port of the optical route switcher 50, and an output light from the optical delay 44b inputs a second input port of the optical route switcher 50. A first output port of the optical route switcher 50 connects to an optical output terminal 52a connecting to an optical line #3, and a second output port of the optical route switcher 50 connects to an optical output terminal 52b connecting to an optical line #4.

The switch controller 48 switches the routes of the optical route switcher 50 according to the header information, especially the route information, from the header extractors 46a and 46b. For instance, when the route information from the header extractor 46a indicates the outputting to the optical line #3, the switch controller 48 controls the optical route switcher 50 to connect the first input port and the first output port of the optical route switcher 50. With this operation, the optical packet from the optical line #1 is output to the optical line #3. Also, when the route information from the header extractor 46a indicates the outputting to the optical line #4, the switch controller 48 controls the optical route switcher 50 to connect the first input port and the second output port of the optical route switcher 50. With this operation, the optical packet from the optical line #1 is output to the optical line #4. The route information from the header extractor 46b is also used in the same manner.

Generally, it requires several μ seconds until the optical route switcher 50 completes the route switching after the optical packet enters each port. The optical delays 44a, 44b are disposed for the purpose of keeping the optical packet until the completion of the route switching.

Figure 4:
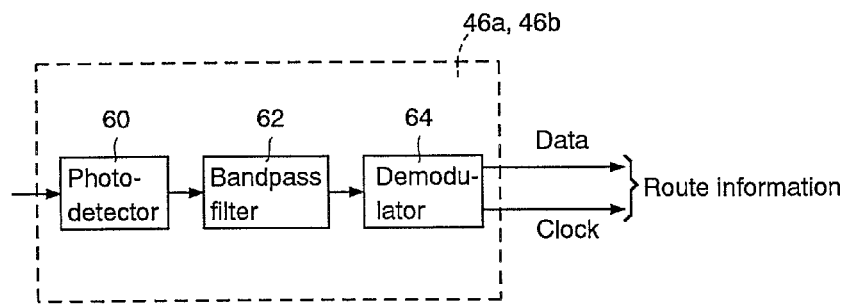
FIG. 4 shows a schematic block diagram of header extractors 46a, 46b.

FIG. 4 shows a schematic block diagram of the header extractors 46a and 46b. A photodetector 60 converts an optical signal from the divider 42a or 42b into an electric signal. A bandpass filter 62 extracts a spectrum component (it was 2.5 GHz in the priorly explained example) of the route information from the output of the photodetector 60. A demodulator 64 regenerates a clock having a carrier frequency of the route information from the output of the bandpass filter 62 and restores the route information with a well-known method. The demodulator 64 outputs the obtained route information data and its clock to the switch controller 48. The switch controller 48 captures the route information data from the demodulator 64 according to the clock from the demodulator 64, determines the route and controls the optical route switcher 50.

Figure 5:
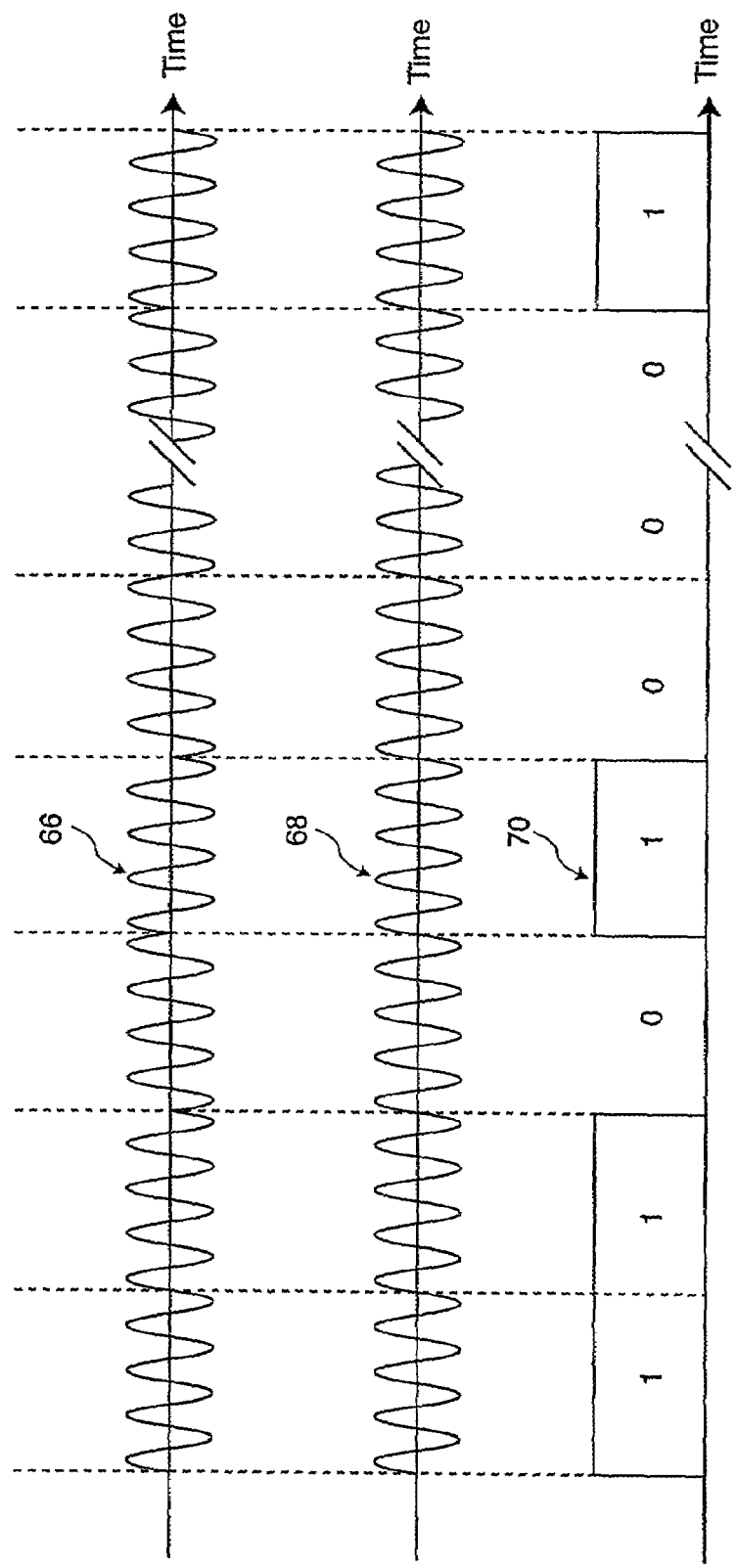
FIG. 5 shows waveforms explaining demodulating operation of a demodulator 64.

FIG. 5 shows waveforms which explain the demodulating operation of the demodulator 64. Reference numeral 66 denotes a waveform of the output signal from the bandpass filter 62. The demodulator 64 regenerates a clock shown as a waveform 68 from the waveform 66 and restores the route information shown as reference numeral 70 by multiplying the both waveforms. The demodulator 64 supplies the route information of the reference numeral 70 and the clock of the reference numeral 68 to the switch controller 48.

As readily understandable from the aforementioned explanation, according to the invention, since the extraction of the header information becomes easier, the configuration of the header extractor can be much simplified and accordingly the optical switcher itself can be more simplified. In addition, the header can be extracted in the high sensitivity. The carrier having one integer of the frequency of the carrier clock of the payload data is used for carrying the header, and so the header information is not lost even after passing through a 3R circuit and a wavelength converter.

While the invention has been described with reference to the specific embodiment, it will be apparent to those skilled in the art that various changes and modifications can be made to the specific embodiment without departing from the spirit and scope of the invention as defined in the claims.

The invention claimed is:

1. An optical transmitter to output an optical packet composed of a header and data, comprising:
   a frequency divider to generate a second clock which synchronizes with a first clock carrying the data and has a frequency I/N one integer of that of the first clock, wherein N is an integer greater than one;
   a phase modulator to modulate a phase of the second clock by the header information; and
   a data arranger to arrange the first clock carrying the data after the output data from the phase modulator.

2. The optical transmitter of claim 1 further comprising a converter to convert the output data from the data arranger into an optical signal.

3. An optical transmission method to output an optical packet composed of a header and data, comprising steps of:
   generating a second clock which synchronizes with a first clock carrying the data and has a frequency equal to 1/N of that of the first clock, wherein N is an integer greater than one;
   modulating a phase of the second clock with the header information; and
   arranging the first clock which carries the data after the phase-modulated second clock.

4. The optical transmission method of claim 3 further comprising a step of converting the phase-modulated second clock and the following first clock carrying the data into an optical signal.

5. A packet generator, which generates a packet comprising a header and data, the packet generator comprising:
   a first clock circuit that produces a first clock;
   a frequency divider that generates a second clock, synchronized with the first clock, having a frequency equal to a frequency of the first clock divided by an integer greater than one;
   a phase modulator that creates a modulated header by phase modulating the second clock with the header; and
   a data arranger that arranges the data within the packet after the header.

6. The packet generator of claim 5 further comprising a converter that converts the packet into an optical signal.

7. A data transmission method, that provides a packet comprising a header and data, the method comprising:
   providing a first clock;
   modulating the first clock with the data to produce modulated data;
   generating a second clock by dividing the first clock by an integer greater than one;
   phase modulating the second clock with the header information to provide header data; and
   arranging the packet such that the header data is transmitted before the modulated data.

8. The method of claim 7 further comprising converting the packet into an optical signal.

* * * * *